(12) United States Patent
Apostolos et al.

(10) Patent No.: US 10,318,785 B2
(45) Date of Patent: Jun. 11, 2019

(54) CREATION OF VIRTUAL INTERSECTION POINTS ON A TOUCHSCREEN TO PERMIT STATIC, NON SWIPING FINGERPRINT USER AUTHENTICATION

(71) Applicant: AMI Research & Development, LLC, Windham, NH (US)

(72) Inventors: John T. Apostolos, Lyndeborough, NH (US); William Mouyos, Windham, NH (US)

(73) Assignee: AMI Research & Development, LLC, Merrimack, NH (US)

( * ) Notice: Subject to any disclaimer, the term of this patent is extended or adjusted under 35 U.S.C. 154(b) by 178 days.

(21) Appl. No.: 15/486,517

(22) Filed: Apr. 13, 2017

(65) Prior Publication Data

US 2018/0004999 A1    Jan. 4, 2018

Related U.S. Application Data

(60) Provisional application No. 62/321,967, filed on Apr. 13, 2016, provisional application No. 62/325,215, filed on Apr. 20, 2016.

(51) Int. Cl.
| | | |
|---|---|---|
| *G06K 9/00* | (2006.01) | |
| *G06F 21/00* | (2013.01) | |
| *G06F 3/041* | (2006.01) | |
| *G06F 3/044* | (2006.01) | |

(52) U.S. Cl.
CPC ........... *G06K 9/0002* (2013.01); *G06F 3/044* (2013.01); *G06F 3/0416* (2013.01); *G06F 21/00* (2013.01); *G06K 9/00026* (2013.01); *G06K 9/00926* (2013.01); *G06F 2203/04104* (2013.01); *G06F 2203/04106* (2013.01)

(58) Field of Classification Search
CPC ............. G06K 9/0002; G06K 9/00026; G06K 9/00926; G06F 3/044; G06F 3/0416; G06F 21/00; G06F 2203/04106; G06F 2203/04104
See application file for complete search history.

(56) References Cited

U.S. PATENT DOCUMENTS

| | | | |
|---|---|---|---|
| 8,368,316 B2 | 2/2013 | Yinn et al. | |
| 8,508,244 B2 | 8/2013 | Seguine | |
| 8,723,825 B2 | 5/2014 | Wright et al. | |
| 9,207,822 B1* | 12/2015 | Kremin | G06F 3/044 |
| 2011/0163992 A1 | 7/2011 | Cordeiro et al. | |
| 2012/0032890 A1 | 2/2012 | Moosavi et al. | |
| 2012/0050216 A1 | 3/2012 | Kremlin et al. | |
| 2013/0222331 A1 | 8/2013 | Kyrynyuk et al. | |
| 2014/0035859 A1 | 2/2014 | Wilson et al. | |

(Continued)

OTHER PUBLICATIONS

International Search Report and Written Opinion of the International Searching Authority, PCT/US2017/027330, dated Sep. 27, 2017.

*Primary Examiner* — John B Strege
(74) *Attorney, Agent, or Firm* — VLP Law Group LLP

(57) ABSTRACT

A method for operating a two-dimensional touch array by providing virtual grid intersections. The techniques may be used to improve the array resolution. It may also be used to detect fingerprint ridge and valley detail even when the finger is not moving, and when the array node spacing is much greater than the ridge and valley spacing.

7 Claims, 15 Drawing Sheets

(56) References Cited

U.S. PATENT DOCUMENTS

| | | | |
|---|---|---|---|
| 2014/0055389 A1* | 2/2014 | Paulsen | G06F 3/041 345/173 |
| 2014/0285469 A1 | 9/2014 | Wright et al. | |
| 2014/0310804 A1 | 10/2014 | Apostolos et al. | |
| 2015/0109243 A1* | 4/2015 | Jun | G06F 3/044 345/174 |
| 2015/0261340 A1 | 9/2015 | Krah | |
| 2016/0042217 A1 | 2/2016 | Kim et al. | |

* cited by examiner

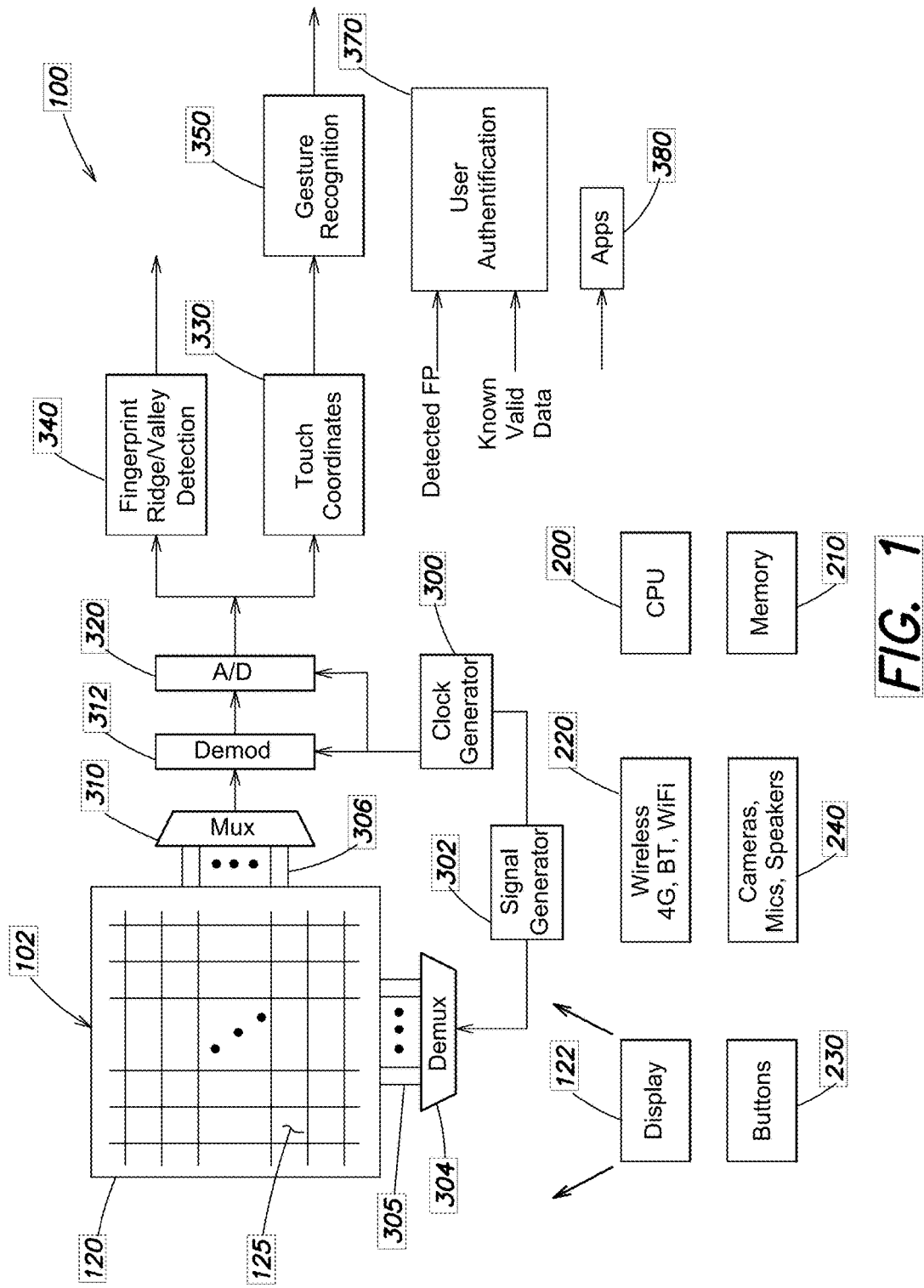

Fields from Out of Phase Excitation of Nodes (2,5) and (3,4). Five Stepping Nulls are Created Along the Diagonal

CREATION OF VIRTUAL INTERSECTION POINTS ON A TOUCHSCREEN TO PERMIT STATIC, NON SWIPING FINGERPRINT USER AUTHENTICATION

CROSS-REFERENCE TO RELATED APPLICATIONS

This patent application claims priority to copending U.S. Provisonal Patent Application Ser. No. 62/321,967, which was filed on Apr. 13, 2016, by John T. Apostolos et al., for TECHNIQUES FOR FINGERPRINT DETECTION AND USER AUTHENTICATION, and U.S. Provisional Patent Application Ser. No. 62/325,215 which was filed on Apr. 20, 2016 entitled CREATION OF VIRTUAL INTERSECTION POINTS ON A TOUCHSCREEN TO PERMIT STATIC, NON SWIPING FINGERPRINT USER AUTHENTICATION, each of which are hereby incorporated by reference in their entirety.

BACKGROUND

Technical Field

This application relates to touchscreens and fingerprint detection.

Background

Computers, smartphones, tablets, vehicle systems, vending machines, and small appliances are just examples of the types of devices which now incorporate touchscreens. Widespread adoption of these devices brings with it an increasing need for security and prevention of unauthorized use.

Recent developments have enhanced the ability to recognize authorized users based on biometric authentication modalities. One approach detects a representation of a user's finger using the same touch sensor array typically used for detecting finger gestures in smartphone or tablet computer. Because this approach uses the existing touchscreen sensor array, the mechanism for recognizing a fingerprint of an authorized user does not require retrofitting additional hardware or new types of sensors.

A typical touchscreen uses a projected capacitive grid structure where every electrode intersection can unambiguously be identified as a touch point or "cell". As the user's finger slides up and down along the grid, the ridges and valleys of the finger also move across a small subset of these touch points. This movement of the finger superimposes a time-varying signal on the outputs of the grid, where amplitude over time is representative of the fingerprint "terrain". See for example, U.S. Patent Publication 2014/0310804 A1 entitled "Fingerprint Based Smartphone User Verification" incorporated by reference herein for more details.

SUMMARY

In one implementation, a touch-sensitive grid is operated in a particular way to provide detailed information concerning a touch location or even fingerprint detail. The grid, which typically consists of an array transmit and receive electrodes is subjected to a sequence of scans. For each particular scan in a sequence of scans, a first excitation signal is applied to a first transmit electrode, and a second excitation signal is applied to a second transmit electrode. The second excitation signal is scaled by an amplitude factor associated with the particular scan in the sequence of scans. The resulting electric field generated adjacent the array in turn depends upon both the first excitation signal and the second excitation signal.

Virtual intersection points located between two or more physical intersection points in the grid are determined by detecting a first response signal from a first receive electrode; detecting a second response signal from a second receive electrode; and then combining the first and second response signals to provide a corresponding combined response signal for each particular scan.

In some embodiments, the second excitation signal is out of phase with the first excitation signal and/or the first excitation signal and second excitation signal are simultaneously applied to the respective first and second transmit electrodes.

The grid may be a two-dimensional array comprising a set of parallel transmit electrodes located along a first axis in a first plane, and a set of parallel receive electrodes located along a second axis in a second plane, and the intersection points of the grid are located adjacent where the transmit and receive electrodes cross. Such a grid may be a mutual capacitive sensor array.

In some implementations, the grid is a sparse grid such that the spacing between adjacent receive and transmit electrodes is a least ten times greater than a spacing between a ridge and valley of a fingerprint.

In addition, the corresponding combined response signals may depend on $(A+B\times coeff)-abs(A-B\times coeff)$ where A is the first excitation signal and B is the second excitation signal, and coeff is the amplitude factor applied to signal B for the particular scan.

BRIEF DESCRIPTION OF THE DRAWINGS

FIG. 1 is a block diagram of a respresentative electronic system.

FIGS. 2-1, 2-2, 2-3 and 2-4 illustrate a touch sensitive grid, a particular crosspoint, and the resulting signal produced by a ridge-valley detector as the finger moves past one of the crosspoints in the array.

FIG. 3 is a grid of a typical touch sensor array used to make finger centroid swipe measurements.

FIG. 4 shows electric field strength over time for each of the mutual capacitance sensors at node A (2,5) and B (3,4) as the finger follows the path of FIG. 3.

DETAILED DESCRIPTION

Example System

Figures 1, 2:
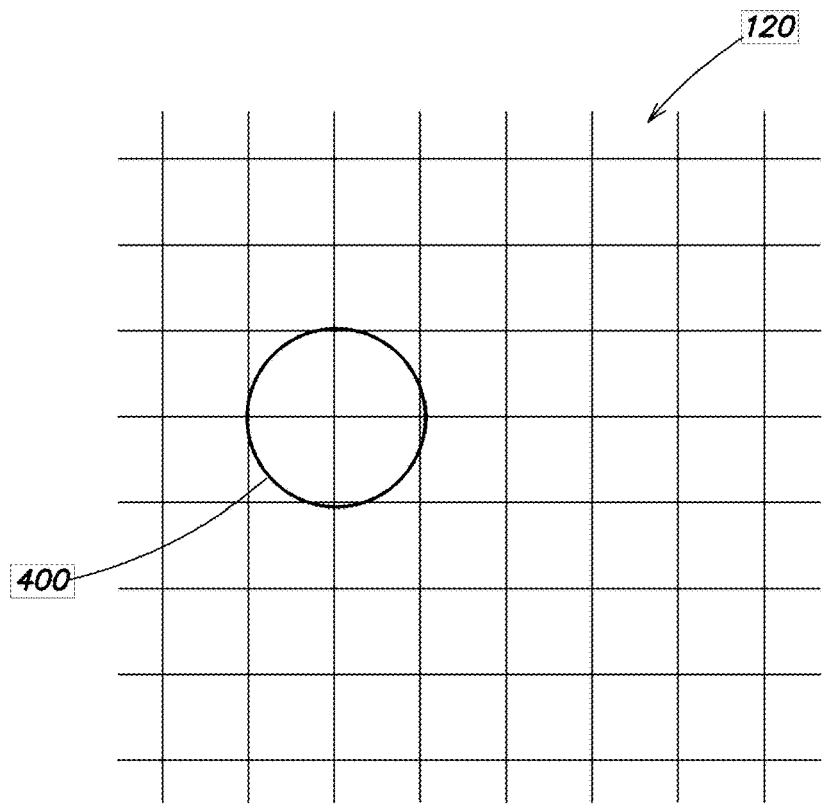
Figure 2:
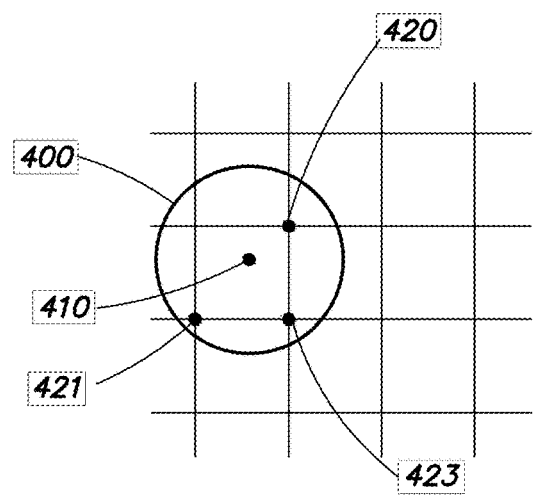

FIG. 1 is a block diagram of a representative electronic system 100 which may implement the techniques described herein. The system 100 may be a smartphone, tablet, personal computer, automobile dashboard, vending machine, small appliance, hand-held device, or some other system that has a touch sensitive surface 102 that includes a touch array 120. It is now common for the touch array 120 to be an integral part of a display assembly 122. Other components of the system 100 may include a central processing unit 200, memory 210, one or more wireless interfaces 220, other input devices such as buttons 220, and other peripheral devices such as cameras, microphones, speakers and the like 240.

Of particular interest to the present discussion is that when a person interacts with the system 100, the sensor array 120 detect touches of the person's finger on or near the surface 102. In the illustrated embodiment, the sensor array includes elements 125 that are disposed as a two-dimensional matrix. Each sensor element 125 (also referred to as a "crosspoint" or "cell" herein) may be implemented as a capacitive sensor. It should also be understood that the sensor array 120 may not be an actual wire grid but may include capacitive pads that overlap in a diamond pattern, a totem-pole pattern, or other geometric patterns of overlaid conductive elements. What is important is that the array 120 provide a set of intersections or crosspoints arranged as a logical grid.

Although not shown in detail, there are numerous known methods for converting the outputs of a capacitive sensor array into a detectable signal, including sensing current versus voltage, phase shifts, resistor-capacitor charge timing, capacitor bridge dividers, charge transfer, successive approximation, sigma-delta modulators, charge accumulation circuits, field-effect, mutual capacitance, frequency shift, many other techniques. The particular method for detecting the relative change in capacitance due to the proximity of a user's finger is not material to the present invention. More details of an example touch sensor array 120 can be found in US Patent Publication U.S. 2013/0222331 assigned to Cypress Semiconductor.

Other circuits in the system 100 may include a clock generator 300, signal generator 302, demultiplexer 304, multiplexer 310, demodulator 312, analog-to-digital converter 320. The clock generator 300, signal generator 302, demultiplexer 304 and multiplexer 310 are controlled by the CPU 200 or other controller to scan the outputs of each individual capacitive element 125 of the touch array 120 in a regular repeating pattern. Processing logic may include touch coordinate determination 330, fingerprint ridge-valley detection 340, gesture recognition 350 and other signal processing implemented in hardware or software. The processing logic may provide additional outputs to functions such as user authentication 370 or software applications 380 executed by the CPU 200.

The processing logic uses outputs from the touch array 120 in various ways. For example, the touch coordinate 330 signal processing may identify one or more local maxima in the output of the array 120. These output signals provide information representing the X-Y coordinates of one or more centroids of the user's finger. This centroid data may then be further processed over time by gesture recognition 350 and other applications 380.

As explained in the Cypress Semiconductor patent publication referenced above, when an object such as a finger approaches the touch array 120, the object causes a decrease in the mutual capacitance between only some of the electrodes in the array 120. For example, when a finger is placed near or on the intersection 125, the presence of the finger will decrease the charge coupling between only a few of the nearby electrodes. Thus the, location of the finger on the touchpad can be determined by identifying the one or more electrodes having a decrease in measured mutual capacitance.

The specific cross point can be identified by noting the particular transmit electrode (TX) to which a signal was applied by the demultiplexer 304 at the time the decrease in capacitance was measured through the multiplexer 310 (demodulator 312) is and analog-to-digital converter 320. In this way, the precise locations of one or more conductive objects such as one or more finger centroids may be determined.

More particularly, the output of signal generator 302 is connected with demultiplexer 304, which allows one or more transmit (TX) signals to be applied to any of the M transmit electrodes 305 of touch array 120. In one embodiment, demultiplexer 304 is controlled so that a TX signal is applied to each transmit electrode 305 in a controlled sequence. Demultiplexer 304 may also be used to ground, float, or connect an alternate signal to the other transmit electrodes to which the TX signal is not currently being applied.

Because of the capacitive coupling between the transmit TX and receive RX electrodes 306, the TX signal applied to each transmit electrode 305 induces a current within each of several receive electrodes 306. The RX signal on each of the receive electrodes 306 can then be measured in sequence by using multiplexer 310 to connect each of the N receive electrodes to demodulation circuit 312 in sequence.

The mutual capacitance associated with each intersection between a TX electrode 305 and an RX electrode 306 is sensed by selecting every available combination of TX electrode and an RX electrode using demultiplexer 304 and multiplexer 310. To improve performance, multiplexer 310 may also be segmented to allow more than one of the receive electrodes in matrix to be routed to additional demodulation circuits.

When an object, such as a finger, approaches the touch array 120, the object causes a decrease in the measured mutual capacitance between only some of the electrodes. For example, if a finger is placed near the crosspoint 125 of a given one of the transmit electrodes 305 and receive electrodes 306, the presence of the finger will decrease the charge coupled between electrodes 305 and 306. Thus, the location of the finger on the touchpad can be determined by identifying the one or more receive electrodes having a decrease in measured mutual capacitance in addition to identifying is the transmit electrode to which the TX signal was applied at the time the decrease in capacitance was measured on the one or more receive electrodes.

By determining the mutual capacitances associated with each intersection of electrodes in the touch array 102, the presence and locations of one or more conductive objects may be determined. The determination may be sequential, in parallel, or may occur more frequently at commonly used electrodes.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected.

The ridge and valley detail of the user's fingerprint may optionally be detected by processing the output of the A/D converter 320 over time. In particular, as a user's finger moves up, down, left, and/or right past a particular grid crosspoint 125, the output of the A/D 320 is a signal representative of the ridge and valley detail of the user's fingerprint.

Figures 2, 3, 4:
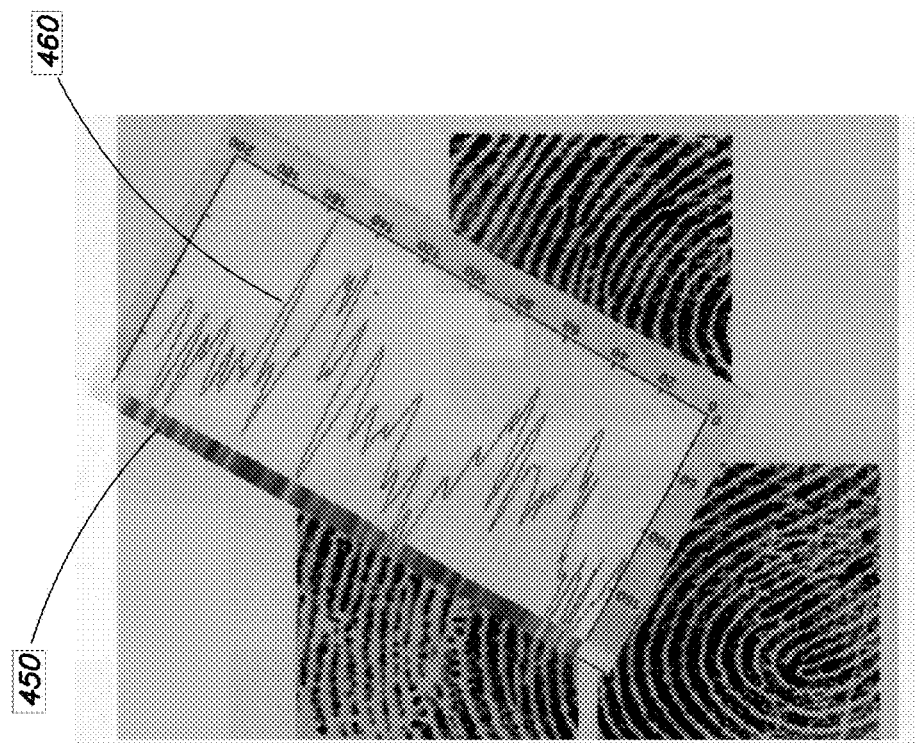
Figures 2, 3:
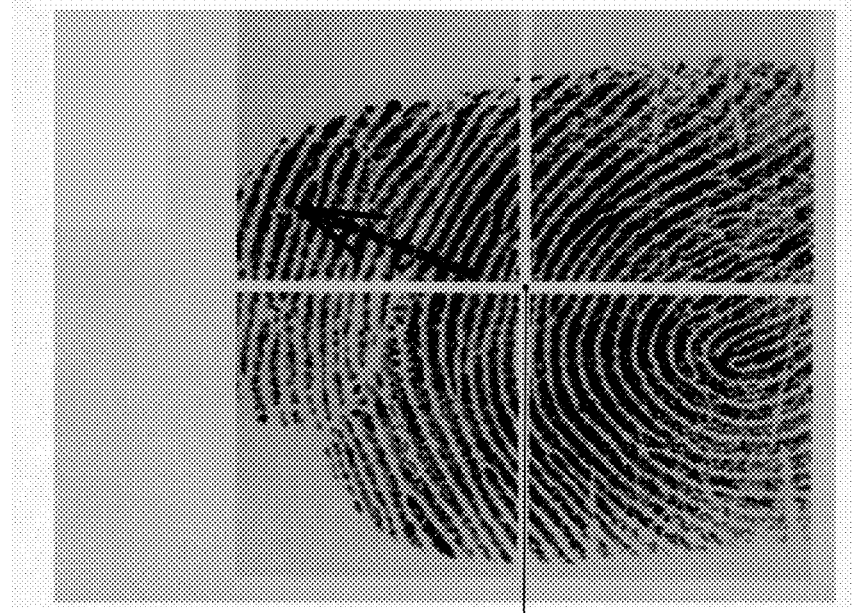
Figure 3:
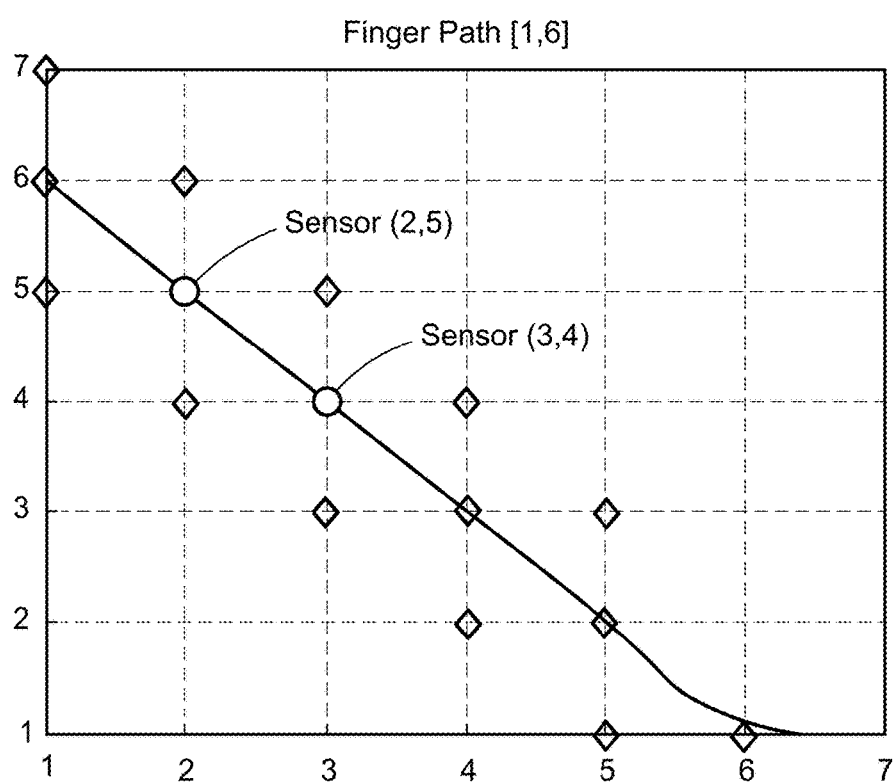
Figure 4:
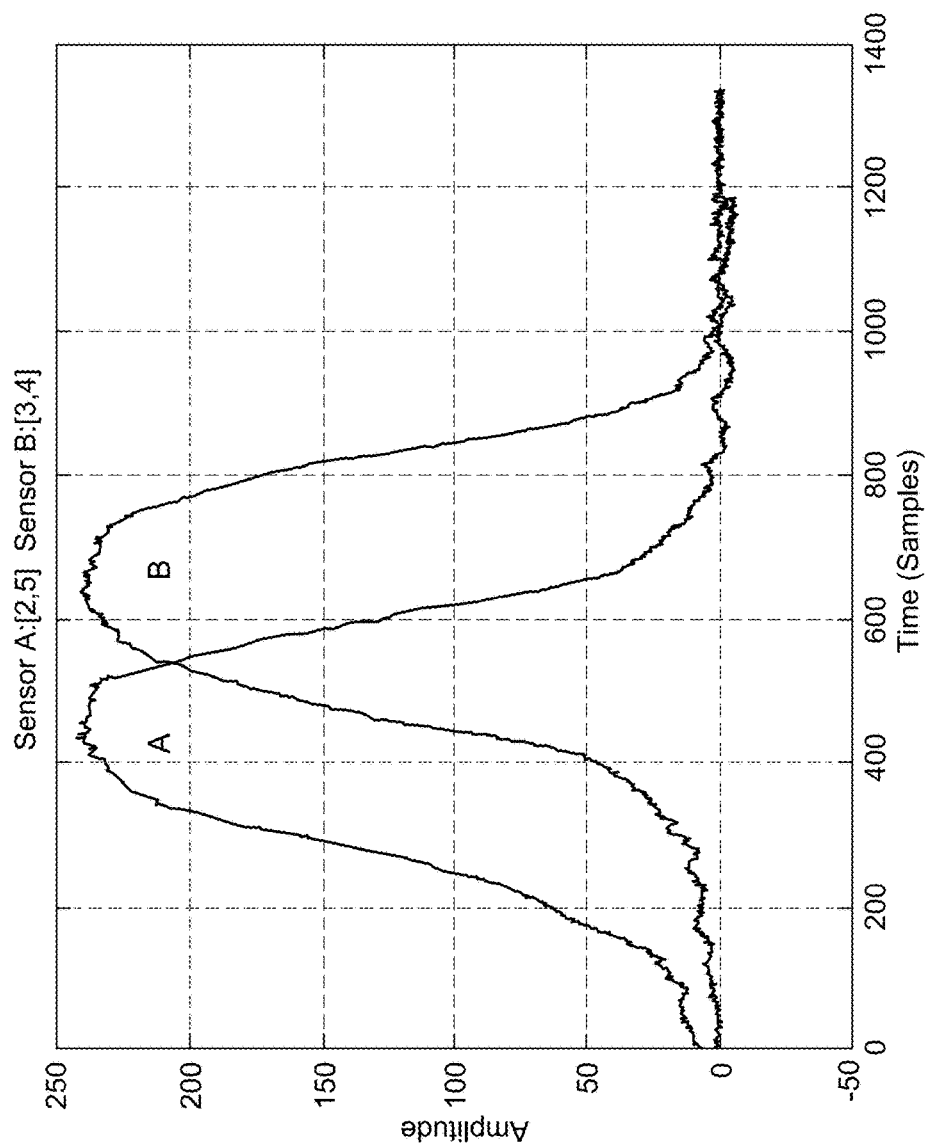

This is true even though the grid is relatively sparse as compared to the spacing between the ridges and valleys of a typical fingerprint. FIG. 2-1 shows a sample grid 120 and adjacent fingertip 400. The spacing between the sparse grid intersection points may be 0.25 inches, whereas a typical ridge and valley spacing is much smaller, on the order of 0.5 mm. FIG. 2-2 shows this situation in more detail where a particular crosspoint 420 of the grid is identified as being closest to the centroid 410 of the fingertip 400. As shown in FIG. 2-3, as the finger moves past the crosspoint 420 (e.g., in the direction of the arrow up and to the right) a signal such as that shown in FIG. 2-4 is produced by the ridge-valey detector 340 as different capacitance values are presented at different instances in time, depending upon whether a ridge or a valley is immediately adjacent the crosspoint 420. The signal is a sequence of grayscale values as shown in the strip 450; the signal can also be thought of as a one-dimensional time varying signal 460 where amplitude represents changes in the ridge-valley depth over time.

More details for how to detect the ridge and valley detail of the fingerprint are described in U.S. Pat. No. 9,432,366 issued Aug. 30, 2016 entitled "Fingerprint Based Smartphone User Verification" which is hereby incorporated by reference.

Creation of Virtual Intersection Points by Manipulating Transmit Signal

FIG. 3 shows the grid of a typical touch sensor array used to make finger centroid swipe measurements. In the example discussed here, a finger is moved from a position on the upper left of the grid along a diagonal line towards the lower right, passing through two grid crossover points (that is, capacitive sensors) located at node A (point 2,5) and node B (at point 3,4).

FIG. 4 shows electric field strength over time for each of the mutual capacitance sensors at node A (2,5) and B (3,4) as the finger follows the path in FIG. 3. A peak in the field strength indicates a point in time where the finger centroid passed the respective node A or B. The horizontal axis, although labelled as time, can also represent distance, such as 0.375 inches in distance between the nodes.

Normally, the nodes are measured sequentially. That is, as already explained above, the outputs of each individual capacitive element 125 of the touch array 120 are normally scanned in a regular repeating pattern, by exciting one of the TX electrodes and detecting the response at the corresponding RX electrode.

However, according to the teachings herein, "virtual" nodes can be created between the physical nodes in the grid. These virtual nodes, or grid intersection points, are created by modifying the way in which the transmit electrodes are excited to generate the electric field. In one example, the two nodes shown are "run" simultaneously with node (2,5) run in normal fashion and node (3,4) run with negative polarity in the transmit excitation pulse. The assumption is made that the plots of mutual capacity are representative of the electric field between the grid lines along the swipe path.

Figure 5:
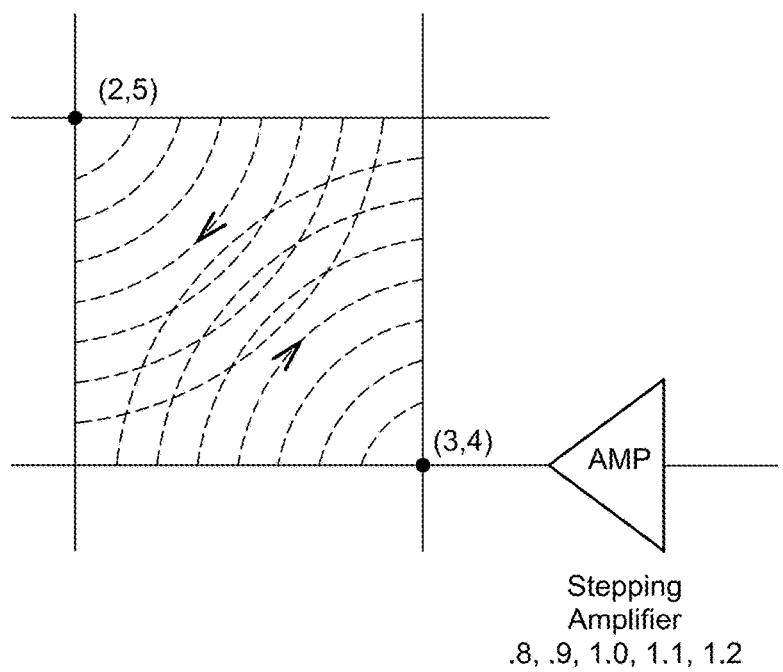
FIG. 5 depicts this situation where the fields are generated by out of phase excitation of node (2,5) and (3,4).

FIG. 5 depicts this situation where the fields are generated by out of phase excitation of node (2,5) and (3,4). Stepping nulls can thus be created along the diagonal between nodes. More particularly, in one embodiment it is possible to create nulls in the field along the "swipe" path by 1) exciting the two nodes out of phase, 2) stepping through a linear progression of amplitude levels (in the example shown, 0.8, 0.9, 1.0, 1.1, and 1.2) for the transmit pulse from node (3,4), and 3) combining the outputs from the two nodes.

Figure 6:
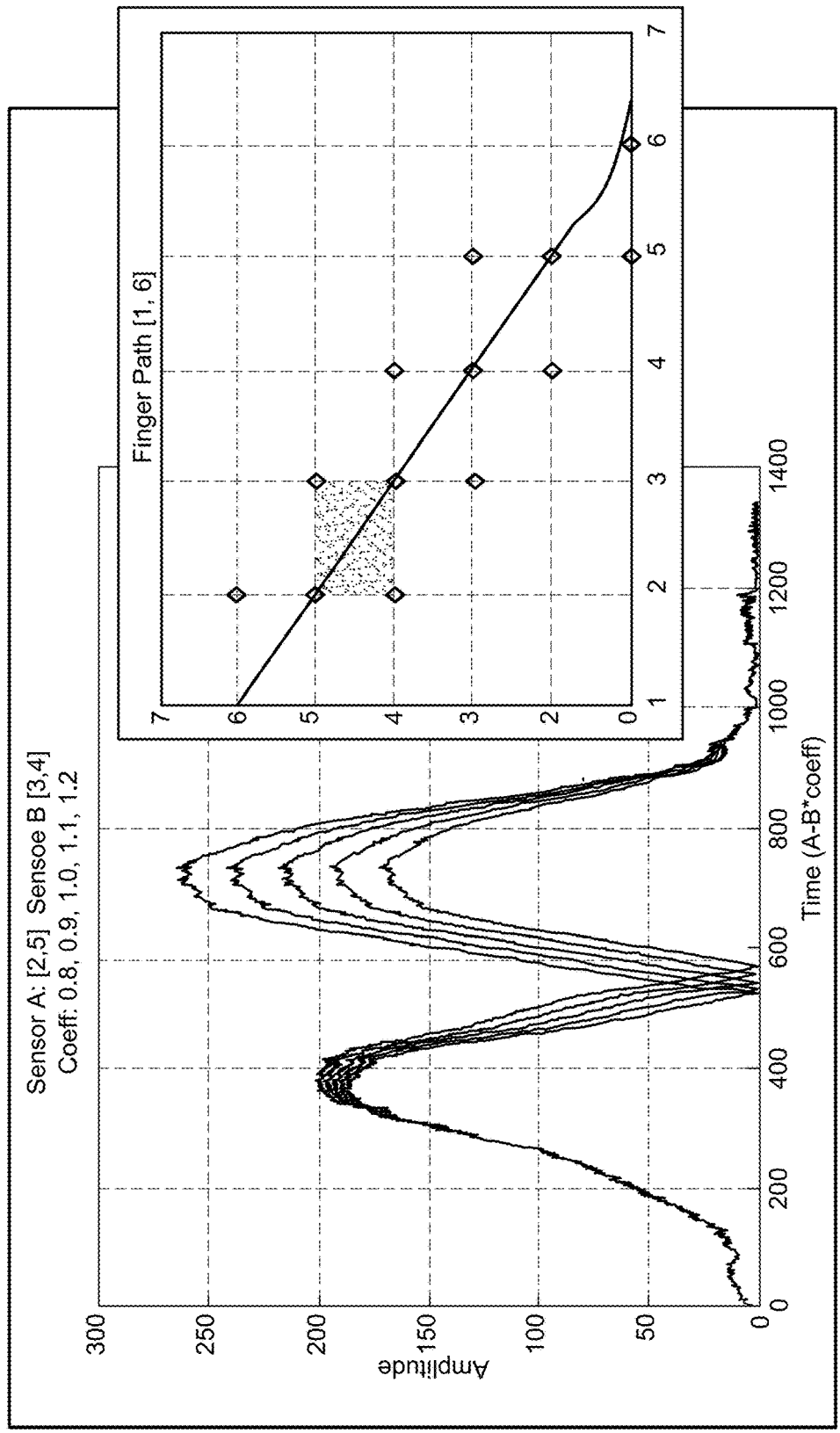
FIG. 6 shows the application of five amplitude levels.

FIG. 6 shows the application of these five amplitude levels in the combined response as a result of creating the series of nulls along the swipe path.

With a finger statically positioned in the geometric center of the grid associated with nodes (2,5) and (3,4), the fields should be anti-symmetrically disposed to permit the creation of the sliding nulls.

It should be understood that the range of amplitude levels is not absolute and should be adjusted depending upon the geometry of the grid, the materials used to construct the grid, the relative mutual capacitance at each crossover point, the electrical characteristics of the grid and the attached circuits, the signal levels necessary at the transmit TX electrodes to generate a detectable response on the RX electrodes, and other factors.

Figure 7:
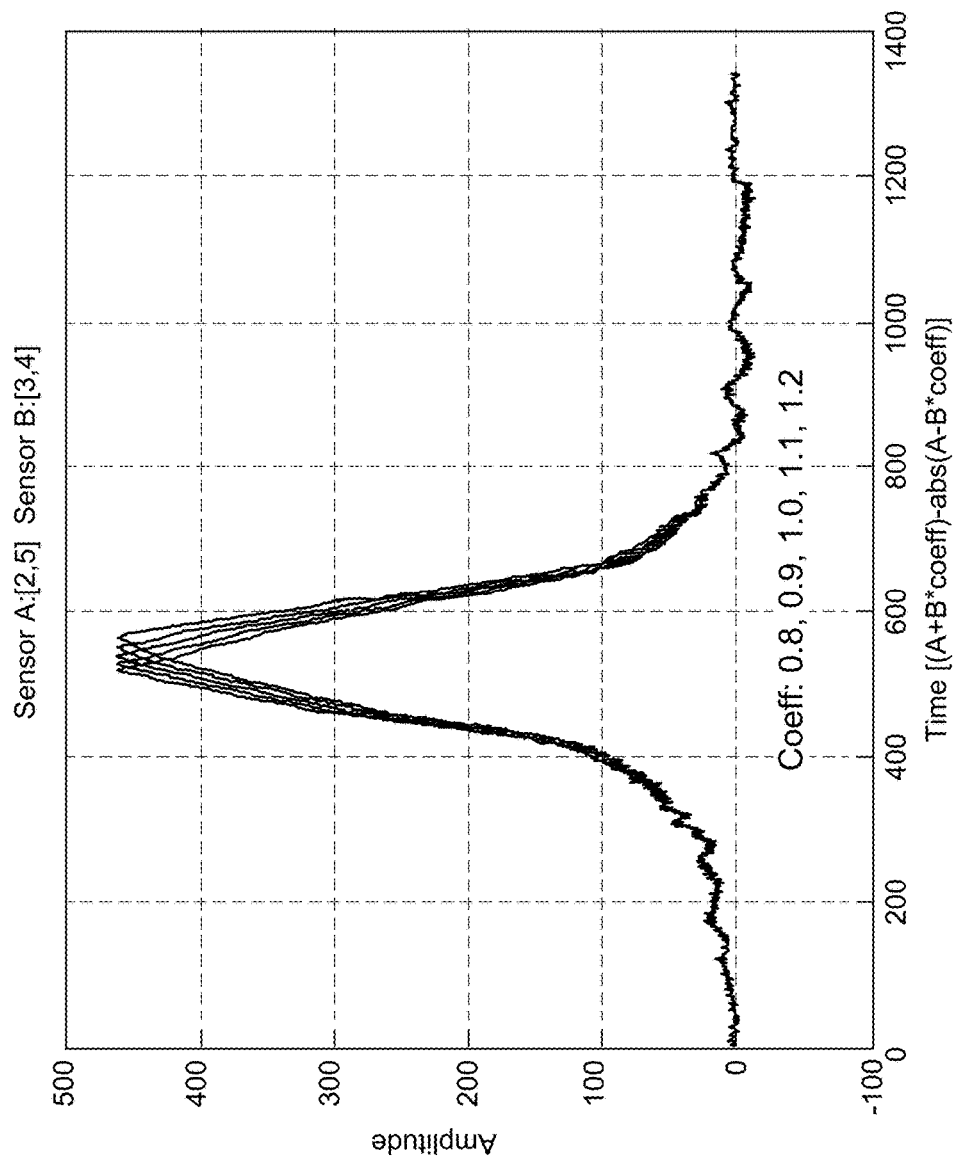
FIG. 7 is the result of combining the in-phase and out-of-phase cases, creating five virtual intersection points.
Figure 8:
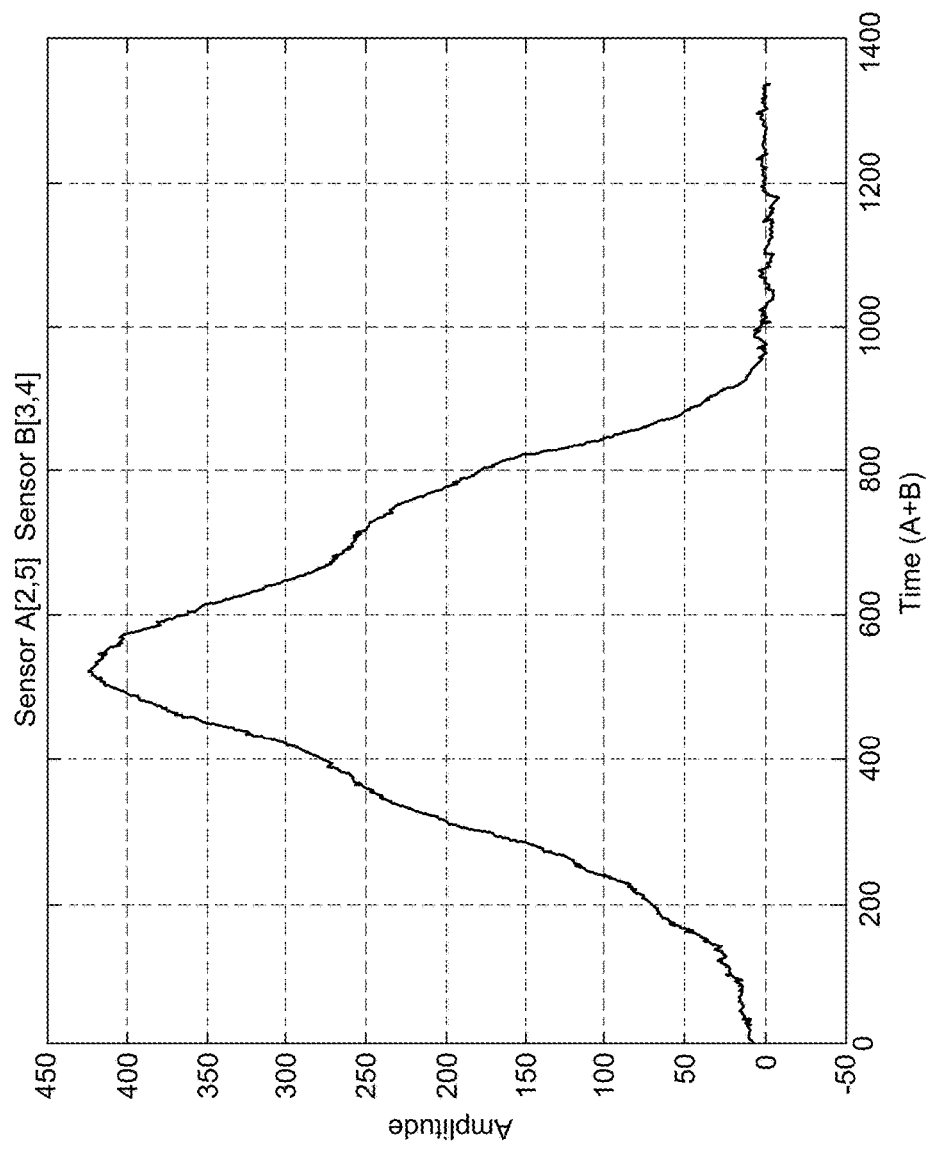
FIG. 8 is the response to in-phase excitation.

It is thus possible to generate a set of sliding virtual intersections by measuring the both the in phase excitation of (2,5) and (3,4) (see FIG. 8) and the out of phase case (as per FIG. 6). Combining the in phase and out of phase cases is shown in FIG. 7. The resulting set of five peaks correspond to the five virtual grid intersection points created along the diagonal between (2,5) and (3,4).

Using this result, it is also possible to generate the ridge and valley profile of the finger along the diagonal between (2,5) and (3,4) using these virtual grid intersection points and without depending upon movement of the finger. A ridge and valley profile "sliding" in the opposite direction from (3,5) to (2,4) can similarly be created, by running the coefficients in the opposite order, potentially providing additional data from the finger.

Depending upon the exact 2-D shape of the null, it may be possible to combine more than two sensors to obtain an even more detailed 2-D representation of the fingerprint by creating additional 2-D sliding virtual intersections.

In some implementations, the virtual intersections may be created in only a portion of the touch array. For example, the virtual intersection process may not necessarily need to be carried out on the whole M by N touch array, but instead only carried out in a smaller region of the touch array adjacent where the finger is already known to be present.

Figure 9:
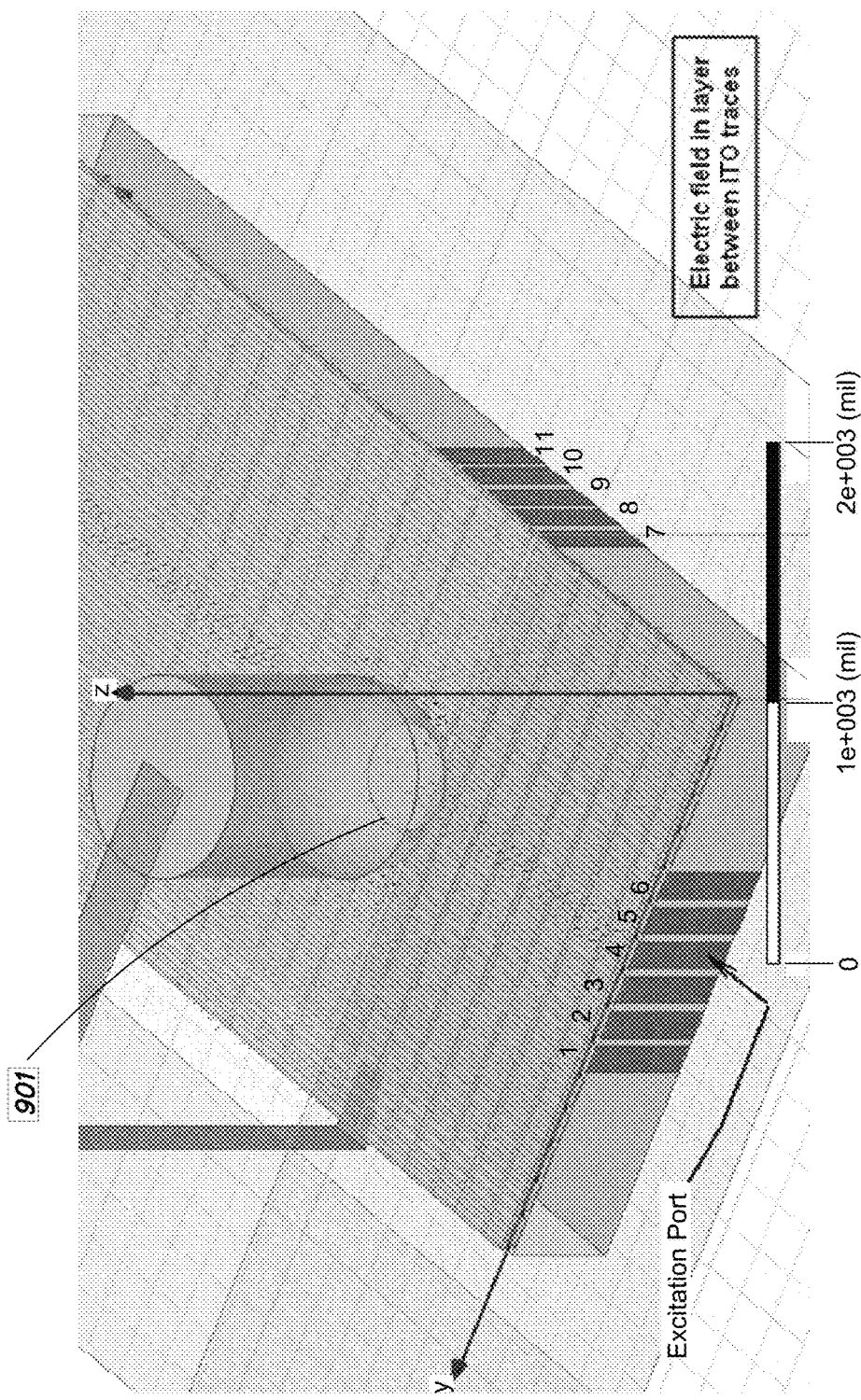
FIG. 9 is a model.

A computer model of the techniques described herein was developed in an effort to confirm the resulting effects. As shown in FIG. 9, the model included a section of the touch array including transmit electrodes labeled 1 to 6 and receive electrodes labeled 7 to 11. The model assumed that a section of a finger 901 was touching the array adjacent the crosspoint (4,8) (that is at the crosspoint associated with transmit electrode 4 and receive electrode 8. Dimensions for the array simulation included a glass thickness of 32 mils, a substrate thickness of eight mils, a column width of 22 mils, a column pitch of 52 mils (times three), a row width of 40 mils, a row pitch of 161 mils, and an ohms per square for the grid of 20 ohms.

Figure 10:
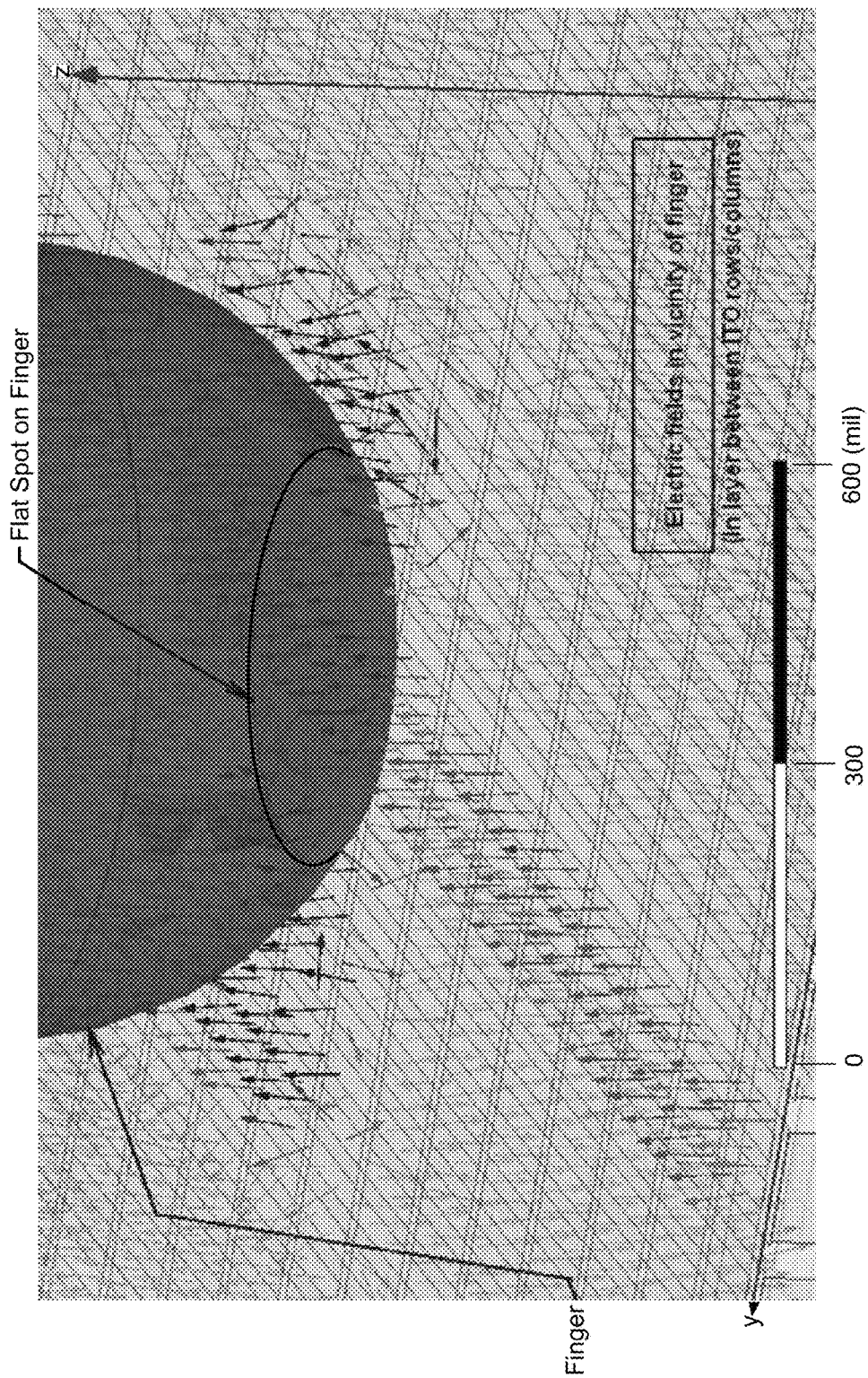
FIG. 10 illustrates the resulting electric fields.

FIG. 10 shows the resulting electric fields generated adjacent the substrate with the finger pressing on the grid at (4,8). Electric fields are generated in a layer between the Indium Titanium Oxide (ITO) electrode rows and columns. FIG. 10 shows the relative amplitude and direction of these fields; it is these fields that are then controlled by adjusting the signals applied to the transmit port(s).

Figure 11A:
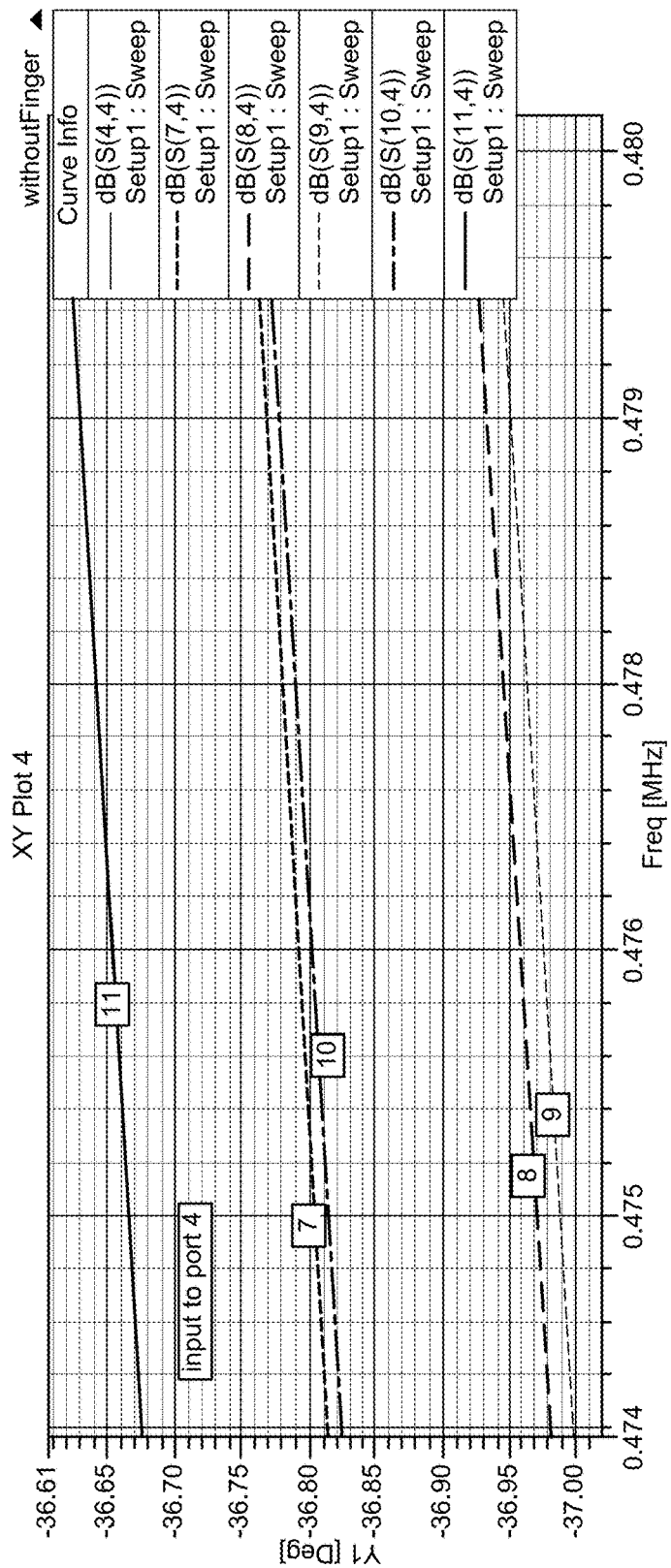
FIGS. 11A and 11B are insertion loss without and with the finger.
Figure 11B:
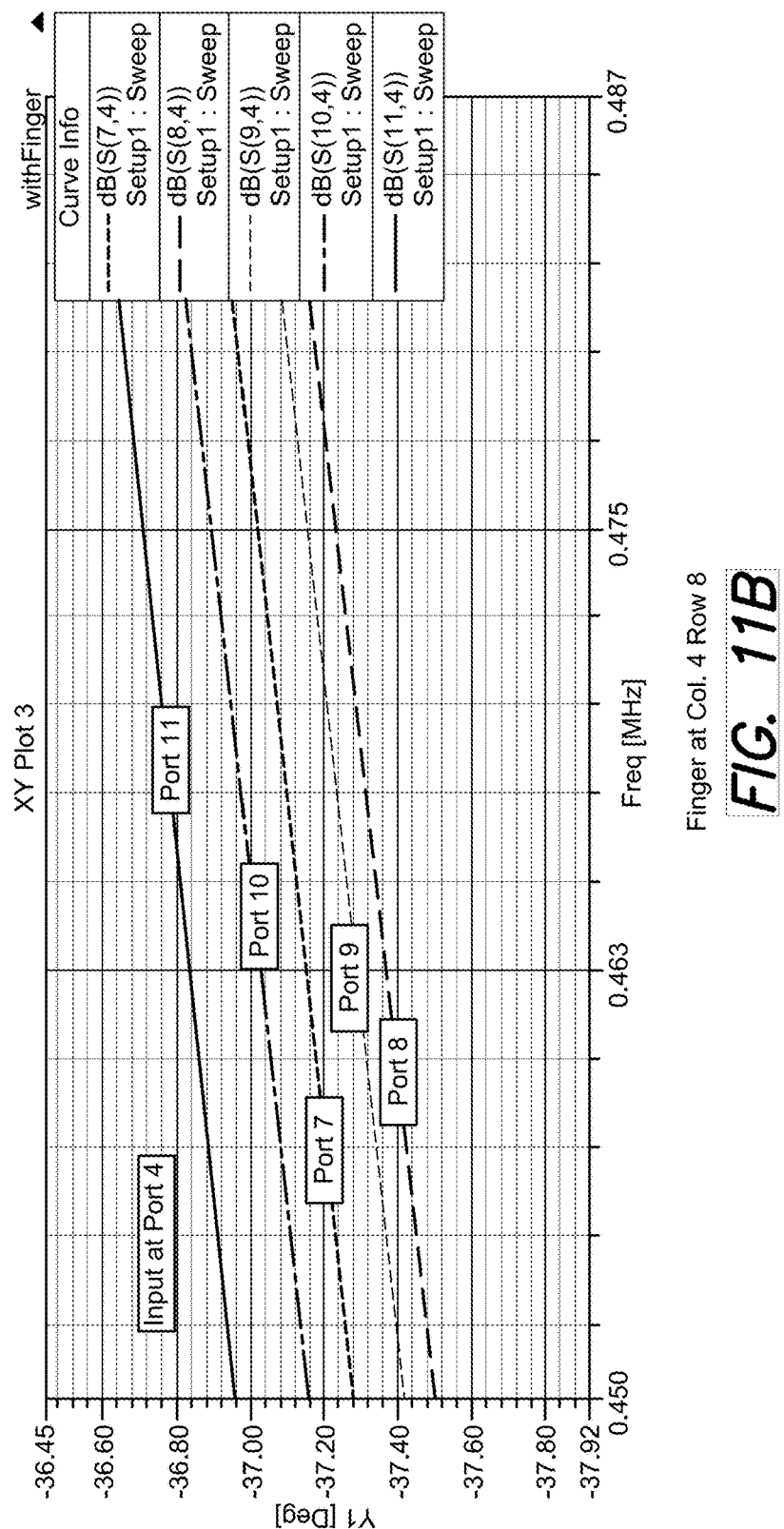
Figure 12A:
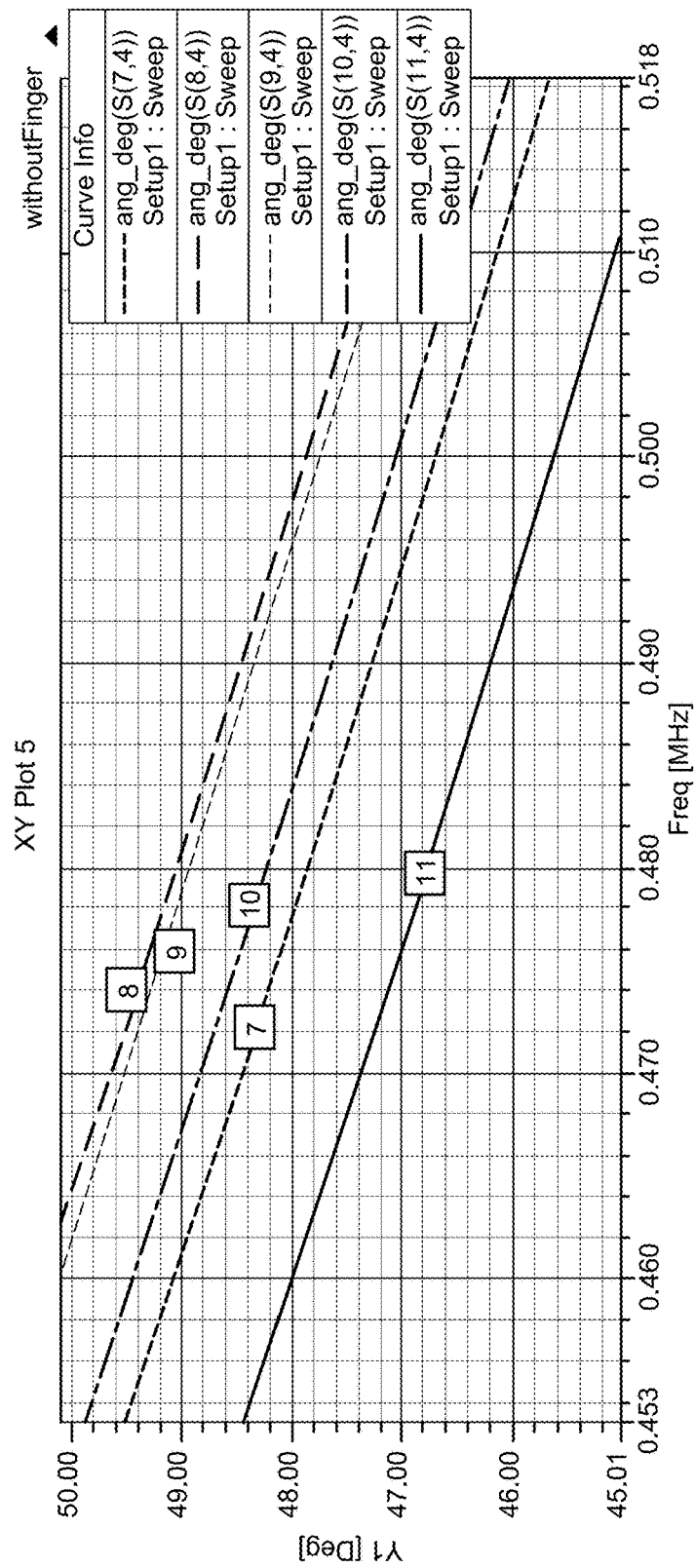
FIGS. 12A and 12B are the phase response without and with the finger.
Figure 12B:
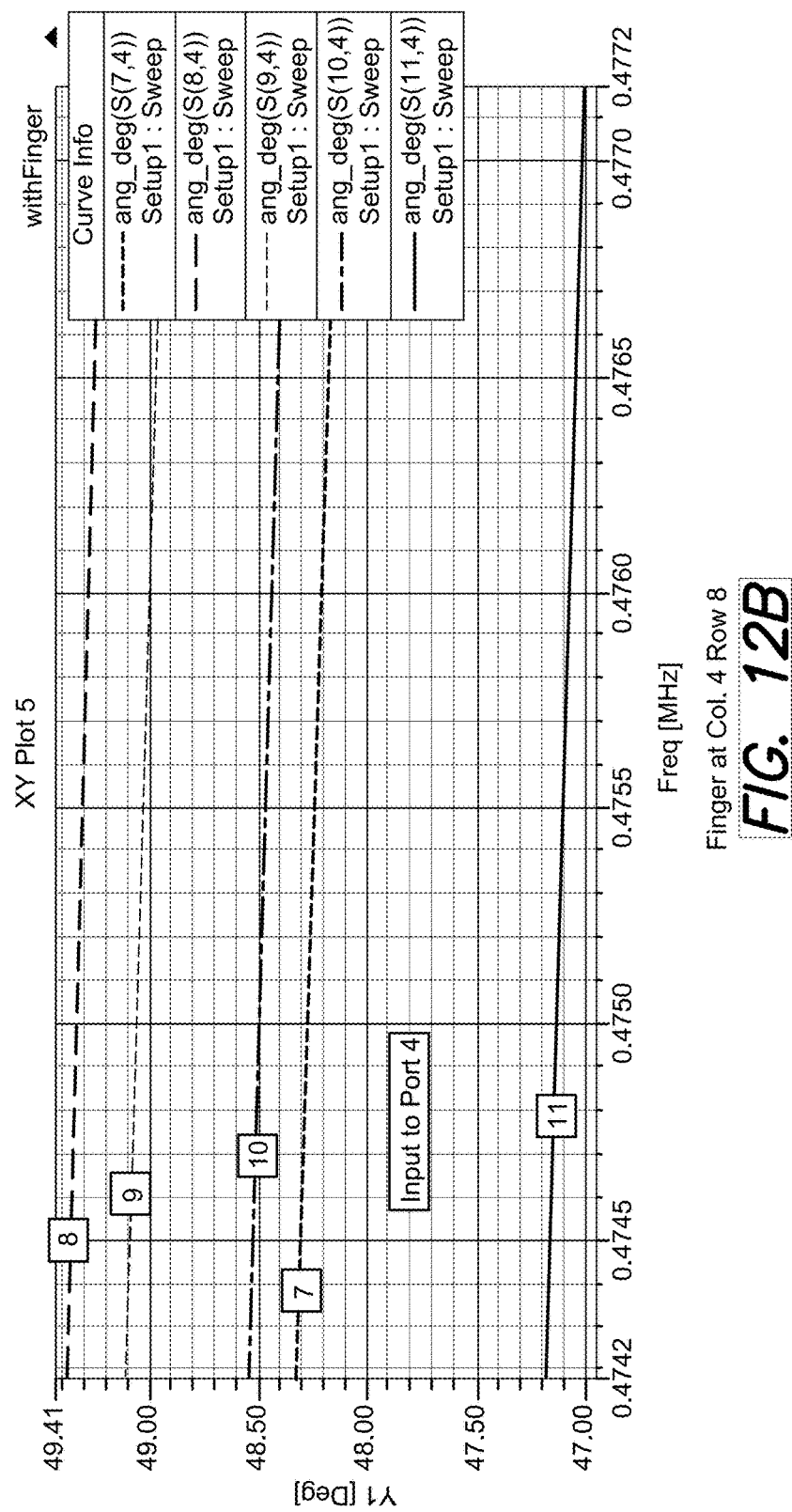

FIGS. 11A and 11B can be compared to show the difference in insertion loss measured at the receive electrodes 8 to 11, comparing a situation where no finger is present on the grid and a situation where a finger is located at (4,8). FIGS. 12A and 12B can be compared to show the resulting difference in the phase response, again again comparing the difference between a finger not being present and a finger being present. Scanning frequencies in megahertz from 0.45 through 0.5 MHz.

Thus it can be seen how signals provide the ability to detect the position of the finger by combining relative signal strength and phases to generated virtual intersection points.

What is claimed is:

1. A method of operating a touch-sensitive grid of transmit and receive electrodes comprising:
   for each particular scan in a sequence of scans,
   applying a first excitation signal to a first transmit electrode;
   applying a second excitation signal to a second transmit electrode, the second excitation signal scaled by an amplitude factor associated with the particular scan in the sequence of scans;
   such that an electric field generated adjacent the array in turn depends upon both the first excitation signal and the second excitation signal;
   detecting a first response signal from a first receive electrode;
   detecting a second response signal from a second receive electrode; and
   combining the first and second response signals to provide a corresponding combined response signal for each particular scan,
   such that the resulting sequence of combined response signals resulting from the is electric fields generated as a result of the sequence of scans corresponds to responses received at a series of virtual intersection points located between at least two physical intersection points of the grid.

2. The method of claim 1 wherein the second excitation signal is out of phase with the first excitation signal.

3. The method of claim 1 wherein the first excitation signal and second excitation signal are simultaneously applied to the respective first and second transmit electrodes.

4. The method of claim 1 wherein the grid is a two-dimensional array comprising a set of parallel transmit electrodes located along a first axis in a first plane, and a set of parallel receive electrodes located along a second axis in a second plane, and the intersection points of the grid are located adjacent where the transmit and receive electrodes cross.

5. The method of claim 1 wherein the grid is a mutual capacitive sensor array.

6. The method of claim 1 wherein the grid is a sparse grid such that the spacing between adjacent receive and transmit electrodes is a least ten times greater than a spacing between a ridge and valley of a fingerprint.

7. The method of claim 1 wherein the corresponding combined response signals depend on (A+B×coeff)−abs(A−B×coeff) where A is the first excitation signal and B is the second excitation signal, and coeff is the amplitude factor applied to signal B for the particular scan.

* * * * *